(12) United States Patent
Chowdhary et al.

(10) Patent No.: US 7,983,210 B2
(45) Date of Patent: Jul. 19, 2011

(54) METHOD AND SYSTEM OF SCANNING A TDMA CHANNEL

(75) Inventors: Dipendra M. Chowdhary, Hoffman Estates, IL (US); David G. Wiatrowski, Woodstock, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1321 days.

(21) Appl. No.: 11/144,991

(22) Filed: Jun. 3, 2005

(65) Prior Publication Data
US 2006/0274714 A1 Dec. 7, 2006

(51) Int. Cl.
*H04B 7/212* (2006.01)
*H04B 7/00* (2006.01)
*H04J 3/06* (2006.01)
*H04W 4/00* (2009.01)
*H04W 72/00* (2009.01)

(52) U.S. Cl. ........ 370/324; 370/350; 370/509; 455/434; 455/464; 455/515

(58) Field of Classification Search .................. 370/314, 370/321, 324, 347, 350, 509; 455/434, 435.1, 455/464, 502, 515
See application file for complete search history.

(56) References Cited

U.S. PATENT DOCUMENTS

| | | | | |
|---|---|---|---|---|
| 5,214,790 A * | 5/1993 | Kozlowski et al. | ........... | 455/518 |
| 5,539,730 A | 7/1996 | Dent | | |
| 6,522,670 B1 * | 2/2003 | Jokinen et al. | ................ | 370/503 |
| 6,992,997 B1 * | 1/2006 | Refai et al. | ..................... | 370/329 |
| 7,013,140 B2 * | 3/2006 | Ostberg et al. | ................ | 455/434 |
| 7,369,869 B2 * | 5/2008 | Wiatrowski et al. | .......... | 455/518 |
| 2001/0055328 A1 * | 12/2001 | Dowling | ........................ | 375/130 |
| 2002/0155813 A1 * | 10/2002 | Song | ................. | 455/63 |
| 2003/0065784 A1 | 4/2003 | Herrod | | |
| 2003/0162535 A1 * | 8/2003 | Nishiyama et al. | ........... | 455/422 |
| 2004/0266457 A1 | 12/2004 | Dupray | | |
| 2005/0130611 A1 * | 6/2005 | Lu et al. | ........................ | 455/130 |

OTHER PUBLICATIONS

PCT Search Report Dated Feb. 6, 2008.
Great Britain Examination Report Dated Jul. 23, 2009.
Australian Rejection Dated Apr. 9, 2009.
GB Rejection Dated Aug. 20, 2009.
GB Grant Jan. 19, 2010.
Australia Notice of Acceptance Dated Aug. 13, 2009.
Australia Letters Patent Dec. 10, 2009.
PCT Preliminary Report on Patentability Dated Mar. 19, 2009.

* cited by examiner

*Primary Examiner* — Andrew Wendell
(74) *Attorney, Agent, or Firm* — Indira Saladi; Valerie M. Davis

(57) ABSTRACT

A method for scanning a TDMA channel by a mobile station in a wireless communications landscape is disclosed. A mobile station detects RF energy on a TDMA channel to detect activity in the detected RF energy. The mobile station maintains knowledge of previous activity on the channel. If activity is present on the channel, the mobile station performs inspection of the activity to determine whether the activity is activity of interest, wherein the activity is activity of interest based on a comparison of the activity with the previous activity. The mobile station aborts the inspection of the activity, if activity is not present on the channel and the mobile station aborts the inspection of the activity, if the determined activity is not activity of interest.

20 Claims, 2 Drawing Sheets

METHOD AND SYSTEM OF SCANNING A TDMA CHANNEL

FIELD OF THE INVENTION

The present invention relates generally to wireless communications systems and more specifically to scanning in a time division multiple access (TDMA) system.

BACKGROUND OF THE INVENTION

A wireless communications system may generally comprise a set of "mobile stations," typically mobile stations are the endpoints of a communication path, and a set of "base stations," (also known as "repeaters") typically stationary and the intermediaries by which a communication path to a mobile station (MS) may be established or maintained. One such type of system is a time division multiple access (TDMA) communication system where the radio medium (or RF frequency) is divided into time slots to carry the communications of the system. Because the communication system carries many communications at one time, a mobile station may want to monitor other communications in the system. Scan is a feature that allows a mobile station to monitor other communications in the system.

MSs of the wireless communications system utilize a feature termed "scan" where an MS locks on to a specific RF frequency (also termed a "channel") and inspects activity that may be present on the channel. The RF frequencies that the MS inspects may be associated with more than one wireless communications system. For example, an MS may inspect RF frequencies associated with the Schaumburg fire department and RF frequencies associated with the Rolling Meadows fire department.

While a mobile station is engaged in a call with a first base station, the mobile station will periodically scan neighboring base stations, e.g. a second base station, for other communications. The mobile station locks onto a specific RF frequency of the second base station and determines whether there is any RF energy on the channel. If there is not, then the mobile station returns to listening to the first base station and continues being engaged in the call. If there is RF energy and that RF energy is above a threshold, then the mobile station continues listening to the channel and determines whether the RF energy is of interest by synchronizing to the channel and decoding a message to determine whether the RF energy is a communication addressed to the mobile station. This process of determining whether the RF energy is a communication address to the mobile station may take a long time which is time away from the call that the mobile station is engaged in with the first base station. Such time away is termed an "audio hole" of the system. If the RF energy is not a communication that is addressed to the mobile station, then the mobile station returns to the call that it was previously engaged in and to listening to the first base station.

In the prior art, the mobile station remembers that the last time the mobile station performed a scan of the second base station and that the RF energy that was associated with the second base station was not of interest to the mobile station. Thus, the next time the mobile station performs scan and listens to the second base station, if RF energy is present, then the mobile station assumes that the RF energy is a continuing communication which is of no interest to the mobile station and quickly returns to the call that it is listening to with the first base station. Such an assumption is made so that the audio hole of the system is minimized.

Assuming that a previous determination of RF energy of no interest for a subsequent inspection of the channel where RF energy is found is not a good assumption for TDMA systems, since the fact that RF energy is available may be attributed to a new call (that may be of interest) in a different time slot as opposed to the same call (that is of no interest) in the same time slot. Thus, to determine whether the RF energy is of a new call or the same call, the mobile station needs to synchronize and decode the RF energy to determine whether the RF energy is a communication that is of interest to the mobile station which causes the function of scan to take more time and causes the "audio hole" problem to be compounded in TDMA systems.

Accordingly, there exists a need for scanning a TDMA channel which improves the amount of time that an MS spends scanning.

BRIEF DESCRIPTION OF THE FIGURES

An illustrative embodiment of the invention is now described, by way of example only, with reference to the accompanying figures in which.

Figure 1:
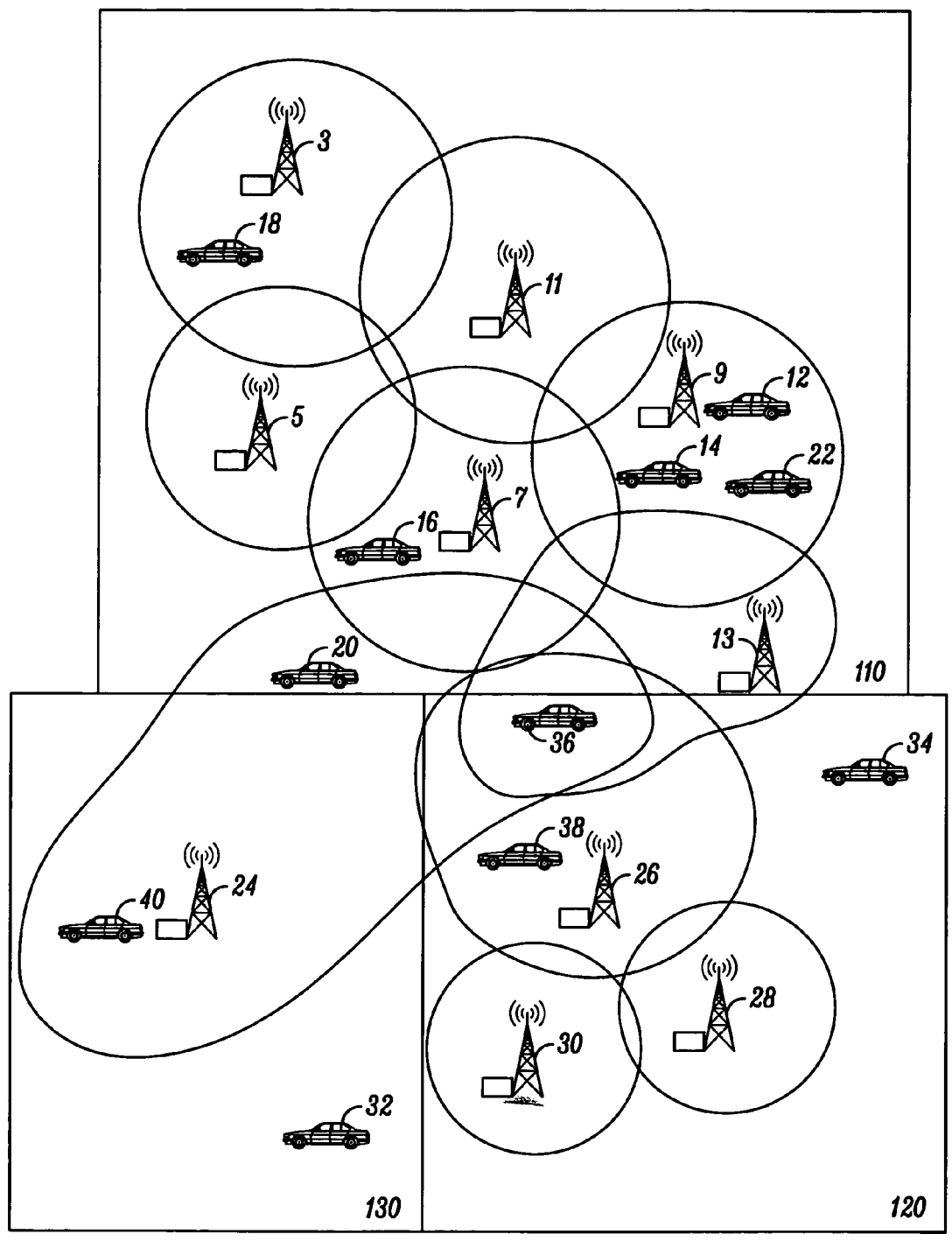
FIG. 1 is a block diagram of an example wireless communications landscape in accordance with an embodiment of the invention.

It will be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate identical elements.

DETAILED DESCRIPTION

Referring now to FIG. 1, there is shown an example of the method and apparatus of the present invention as it may be employed and incorporated into a typical wireless communications landscape 100 having system 110, system 120, and system 130. The illustrated example has three systems 110, 120, 130 whereby a system is comprised of a multiplicity of communication resources of RF frequencies, base stations (BSs) and mobile stations (MSs) optionally managed by system controllers (not shown) whereby the MSs send and receive communications with BSs (also known as "repeaters").

System 110 comprises a plurality of cells, each with a BS 3, 5, 7, 9, 11, 13 typically located at the center of the cell, and a plurality of MSs 12, 14, 16, 18, 20, 22 all of which are communicating on RF frequencies assigned to system 110. The MSs 12, 14, 16, 18, 20, 22 in system 110 may include all the RF frequencies associated with the BSs 3, 5, 7, 9, 11, 13 in system 110 in their preprogrammed scan lists. Further, the MSs 12, 14, 16, 18, 20, 22 may include RF frequencies associated with communicating directly with other MSs in the wireless communications landscape 100.

System 120 comprises a plurality of cells, each with a BS 26, 28, 30 typically located at the center of the cell, and a plurality of MSs 34, 36, 38 all of which are communicating on RF frequencies assigned to system 120. The MSs 34, 36, 38 of system 120 may include all the RF frequencies associated with BSs 26, 28, 30 in their preprogrammed scan lists. Further, MS 36 may include RF frequencies associated with the BSs in system 110 and with the BS in system 130 since the MS 36 is sufficiently close to all three systems 110, 120, 130.

System 130 comprises a cell with a BS 24 and MSs 32, 40 all of which are communicating on RF frequencies assigned to system 130.

A BS preferably comprises fixed equipment for communicating data/control and voice information to and from the MSs for facilitating communications between the MSs in the wireless communication landscape 100. A mobile station (MS) preferably comprises mobile or portable devices (such as an in-car or handheld radios or radio telephones) capable of communicating with a BS using time division multiple access (TDMA) or time division duplex (TDD) techniques as further described herein, in which specified time segments are divided into assigned time slots for individual communication. As is known in the art, each RF frequency in the system carries time slots whereby each time slot is known as a "channel." Thus, for the BSs shown in FIG. 1, each BS has two channels associated with the coverage area.

In an illustrative embodiment of the present invention, the wireless communications landscape 100 assumes a two slot TDMA communications system; however, other slotting ratios may be used in the TDMA communications system and still remain within the spirit and scope of the present invention. Further, a system in the wireless communications landscape 100 may be an analog communications system or a digital frequency division multiple access (FDMA) system. Thus, the systems in the wireless communications landscape are not limited to digital TDMA communications systems. Thus, a MS, e.g. MS 36, in the wireless communications landscape 100 may maintain frequencies associated with analog, digital FDMA, and digital TDMA systems.

As used herein, the terms "communication" and "transmission" are used interchangeably and refer to contiguous TDMA bursts emanating from one radio in one timeslot. As such, transmissions may generically refer to voice, data or control information relating to the wireless communications landscape 100. The term "call" refers to related voice transmissions between MSs in the wireless communications landscape 100.

As is known in the art, the term "burst" refers to the smallest standalone unit of a TDMA transmission. In an illustrative embodiment, for a burst found in a Motorola Low Tier Digital system, a defined transmission is 216 bits of payload and 48 bits of synchronization or embedded signaling.

In an illustrative embodiment, a scan is performed periodically to determine whether to handoff to a neighboring base station. For example, referring to FIG. 1, mobile station 36 may be listening to base station 24 and may periodically scan neighboring base stations, e.g. base stations 26, 13, 7. Such a situation occurs, for example, when MS 36 may be engaged in an audio call of low priority and associated with BS 24 for that low priority audio call but scans neighboring BSs, namely BS 26, 13, 7, for other activity of interest where the other activity of interest may be of higher priority. Thus, the MS 36 scans neighboring base stations to find activity of interest so that the MS 36 can handoff to a neighboring base station if the activity of interest is of greater priority than the communication that the MS is currently engaged in while associated with BS 24.

In a further embodiment, the mobile station may be listening to other mobile stations and may periodically scan the neighboring mobile stations. Such a situation is referred to as "direct mode" or "talkaround mode" and refers to using a downlink frequency of the mobile station to communicate with another mobile station. In such a case, the communications of the mobile station are independent of any base station in the wireless communications landscape 100.

As used herein, activity is defined as a voice message, data message, control message, or an idle message on the channel. Further, activity of interest is defined as activity that is addressed to the MS. For example, a talk group call and a broadcast call are types of activities of interest that may be addressed to an MS. Further, as described below, activity of interest may be activity that is different than previous activity on the channel. Further yet, as described below, activity of interest may be receiving a voice header that is addressed to the MS.

Figure 2:
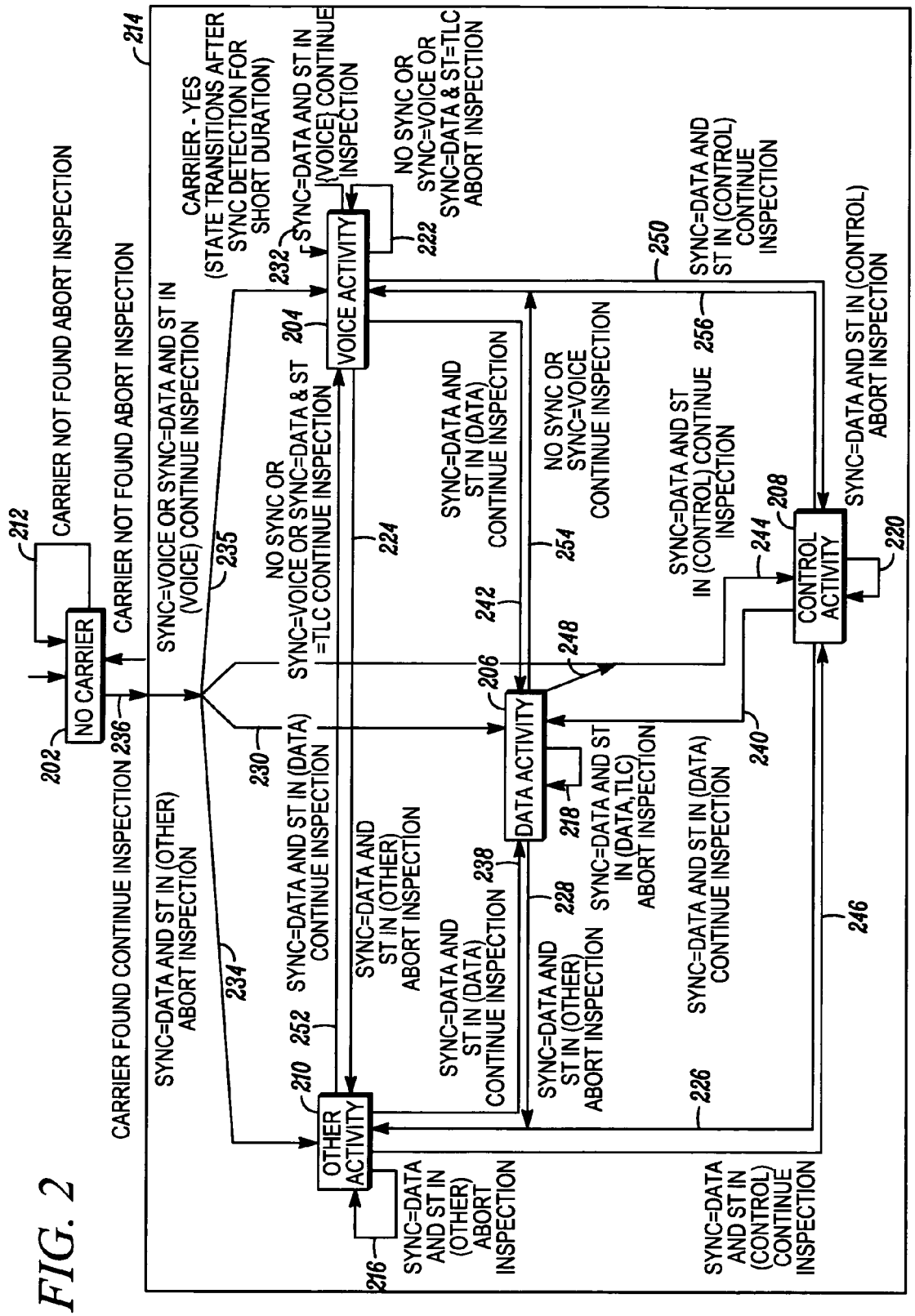
FIG. 2 is a flow diagram of an example state transition diagram for scanning in a TDMA system.

At the highest level, an embodiment of the present invention improves the time that an MS spends scanning by inspecting the channel to determine whether there is activity, then continuing the inspection if the activity may be of interest. Otherwise, an embodiment of the present invention improves the time that the MS spends scanning by aborting the inspection if there is not activity or if there is known activity of no interest. Thus, aborting the inspection means to perform a short sample of the activity on the channel and continuing the inspection means to perform a long sample of the activity on the channel. Referring to FIG. 2, if there is no change in activity (e.g. Links 216, 220, 222, 218, 212), then abort the inspection. If there is a change in activity to an activity that is of no interest, e.g. other activity (e.g. Links 224, 228, 226, 234), then abort the inspection. If you transition to an activity of interest, e.g. either the data (e.g. Links 230, 238, 240, 242), voice (e.g. Links 235, 252, 254, 256), or control (e.g. Links 244, 246, 248, 250) activity, then you continue inspection. If you receive a voice header (Link 232), then you continue inspection.

Referring to FIG. 2, in operation, an MS performs the function of scanning by tuning to a specified channel enumerated in a scan list and pausing on the selected channel for a specified time period to test whether an RF carrier is detected (Block 202). In one embodiment, a scanning MS pauses for a predetermined length of time, e.g. 25 msecs, before continuing. As is known in the art, the specified time period depends upon the type of signal expected to be received by the scanning MS such as analog voice, FDMA digital, and TDMA digital.

If no RF carrier is present or is not otherwise found (Link 212), the scanning MS stops the inspection process and stays in the no carrier state (Block 202). The scanning MS stays in the no carrier state (Block 202), until a carrier is found. As mentioned above, the scanning MS periodically performs the function of scan, so the next trigger for performing the function of scan is to determine whether there is a RF carrier (Block 202).

If an RF carrier is present (Block 214), then the scanning MS remains on the selected channel and continues inspection of the channel to determine the type of activity that is found on the channel (Blocks 204, 206, 208, 210). Continuing inspection means to stay on the channel, synchronize to the signal, lock on to the channel, and decode at least one message to determine the type of activity on the channel. In one embodiment, the scanning MS remains on the selected channel for a specified time period to test whether the activity is of interest. As mentioned above, the specified time period depends upon the type of signal expected to be received by the scanning MS such as analog voice, FDMA digital, and TDMA digital. Further, the specified time period may depend upon the type of scan being performed. For example, if the scanning MS is programmed to scan for channels only carrying data transmissions, then it may wait for 65 msecs before continuing.

In simplest terms, an embodiment of the present invention determines the type of activity on the channel to minimize the time spent performing inspection where the type of activity is one of four categories, e.g. voice, data, control, and other. Further, if the activity has not changed, then the next time scan is performed, the time spent performing scan is minimized because inspection of the channel is aborted since the activity has not changed.

Specifically, an embodiment of the present invention determines the type of activity on the channel by decoding messages identifying the type of activity on the channel. In a specific example, the scanning MS remains on the selected channel to receive synchronization and slot type messages to determine the type of activity on the channel.

In the specific example, the synchronization message indicates either voice or data activity. If the synchronization message indicates voice activity, then there is no additional field. In an exemplary embodiment, if the activity on the channel is voice activity, then there is a synchronization message sent every six timeslots during the voice activity. Thus, the scanning MS may inspect the channel and not receive a synchronization message within a time period. Not receiving a synchronization message within a time period may imply that the activity on the channel is voice activity. If the synchronization message indicates data activity, then there is an additional field that is called the slot type that indicates further information about the data activity. In an exemplary embodiment, assuming that the BS is keyed, if the activity on the channel is not voice activity, then there is a synchronization message sent during every timeslot.

In an illustrative embodiment, receiving the synchronization message between the BS and the MS involves waiting a predetermined period of time for detecting a time slot synchronization signal. The time slot synchronization signal is a 48 bit (also known as 24 symbols) frame sync word. The time slot synchronization signal identifies the center of a TDMA burst and the type of communication present on the TDMA channel so that a receiver in the scanning MS may be able to receive transmissions on the TDMA channel. Performing synchronization is complete upon detection of the time slot synchronization signal within a predetermined period of time. In one embodiment, the scanning MS must receive the time slot synchronization signal within 335 msecs. If the communication between the MS and the BS is in synchronization or the MS is successfully able to perform synchronization between the BS and the MS, then the MS determines whether the synchronization message specifies voice or data of the active transmission on the channel.

By looking at the synchronization and slot type the type of activity on the channel can be determined. Thus, the next time that inspection is performed, if the activity has not changed, then the inspection is aborted. Specifically, if the last time that the scanning MS performed inspection, it found that the type of activity on the channel was "other," then the next time that it performs inspection, if the scanning MS finds that the synchronization message indicates data activity and the slot type field indicates "other," then the inspection is aborted (Link 216). That is, the activity on the channel has not changed.

Similarly, if the last time that the scanning MS performed inspection, it found that the type of activity on the channel was "data," then the next time that it performs inspection, if the scanning MS finds that the synchronization message indicates data activity and the slot type field indicates one of "data" or "terminator with link control" then the inspection is aborted (Link 218). That is, the activity on the channel has not changed from data activity.

Similarly, if the if the last time that the scanning MS performed inspection, it found that the type of activity on the channel was "control," then the next time that it performs inspection, if the scanning MS finds that the synchronization message indicates data activity and the slot type field indicates "control" then the inspection is aborted (Link 208). That is, the activity on the channel has not changed from control activity.

Similarly, if the last time that the scanning MS performed inspection, it found that the type of activity on the channel was "voice," then the next time that it performs inspection, if the scanning MS finds that a) the synchronization message indicates voice activity, b) the synchronization message indicates data activity and the slot type field indicates "terminator with link control," or c) there is no synchronization (as mentioned above, because a synchronization message is sent once every six timeslots, a synchronization message may not be available), then the inspection is aborted (Link 224). That is, the activity on the channel has not changed from voice activity. In an exemplary embodiment of the present invention, aborting the inspection via Link 224 is an improvement over the prior art, since the scanning MS assumes that voice activity is still present on the channel and aborts the inspection to minimize the time spent performing scan. In an exemplary embodiment, the scanning MS spends approximately 60 msecs looking for a synchronization message before it aborts inspection.

Thus, since in the cases where the activity has not changed since the last time the scanning MS performed scan, the inspection is aborted (namely Links 216, 218, 220, 222) and the time spent performing scan is minimized.

Returning to FIG. 2, if at any time, regardless of the state that the scanning MS is in, e.g. Blocks 210, 206, 208, 204, if the scanning MS receives an indication that the activity on the channel is not of interest, then the inspection is aborted. Specifically, if a synchronization message indicates data activity and the slot type field is other, then the inspection is aborted. A first example, if the scanning MS previously received voice activity (Block 204) and then receives a synchronization message indicating data and the slot type field indicates other (Link 224), then the scanning MS aborts inspection of the channel and has knowledge that the activity on the channel is not of interest (Block 210). A second example, if the scanning MS previously received control activity (Block 208) and then receives a synchronization message indicating data and the slot type field indicates other (Link 226), then the scanning MS aborts inspection of the channel and has knowledge that the activity on the channel is not of interest (Block 210). A third example, if the scanning MS previously received data activity (Block 206) and then receives a synchronization message indicating data and the slot type field indicates other (Link 228), then the scanning MS aborts inspection of the channel and has knowledge that the activity on the channel is not of interest (Block 210).

Thus, since the activity is of no interest, the time spent scanning is minimized and inspection is aborted.

Returning to FIG. 2, when a scanning MS transitions from another state to either the data, voice, or control activity states (Blocks 206, 208, 204), the scanning MS spends extra time to determine whether the activity on the channel is addressed to the scanning MS.

For example, when the scanning MS transitions from the no carrier state (Block 202) to the data activity state (Block 206), the scanning MS has received indication that a carrier is found (Link 236), that the synchronization message indicates data and the slot type field is data (Link 230), then the scanning MS continues to inspect the activity on the channel by decoding addressing information to determine whether the data activity is addressed to the scanning MS. Similarly, the scanning MS performs the same functions when transitioning from the other activity state (Block 210) to the data activity state (Block 206) via Link 238, from the control activity state (Block 208) to the data activity state (Block 206) via Link 240, and from the voice activity state (Block 204) to the data activity state (Block 206) via Link 242. In any case, the scanning MS has determined that there is data activity on the channel and continues the inspection to determine whether the data activity is addressed to the scanning MS.

For example, when the scanning MS transitions from the no carrier state (Block 202) to the control activity state (Block 208), the scanning MS has received indication that a carrier is found (Link 236), that the synchronization message indicates data and the slot type field is control (Link 244), then the scanning MS continues to inspect the activity on the channel by decoding addressing information to determine whether the control activity is addressed to the scanning MS. Similarly, the scanning MS performs the same functions when transitioning from the other activity state (Block 210) to the control activity state (Block 208) via Link 246, from the data activity state (Block 206) to the control activity state (Block 208) via Link 248, and from the voice activity state (Block 204) to the control activity state (Block 208) via Link 250. In any case, the scanning MS has determined that there is control activity on the channel and continues the inspection to determine whether the control activity is addressed to the scanning MS.

For example, when the scanning MS transitions from the no carrier state (Block 202) to the voice activity state (Block 204), the scanning MS has received indication that a carrier is found (Link 236), that a) the synchronization message indicates voice or b) the synchronization message indicates data and the slot type field is voice (Link 235), then the scanning MS continues to inspect the activity on the channel by decoding addressing information to determine whether the voice activity is addressed to the scanning MS. Similarly, the scanning MS performs the same functions when transitioning from the other activity state (Block 210) to the voice activity state (Block 204) via Link 252, from the data activity state (Block 206) to the voice activity state (Block 204) via Link 254, and from the control activity state (Block 208) to the voice activity state (Block 204) via Link 256. In any case, the scanning MS has determined that there is voice activity on the channel and continues the inspection to determine whether the voice activity is addressed to the scanning MS.

Returning to FIG. 2, if the scanning MS previously found voice activity on the channel and then the scanning MS receives a voice header (Link 232), then the scanning MS remains on the channel to receive the voice header to determine whether the voice activity is addressed to it. The scanning MS decodes the voice header because it was lucky enough to have received the information.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. A method for scanning a TDMA channel by a mobile station in a wireless communications landscape, the method comprising the steps of:
    at the mobile station:
        detecting RF energy on a TDMA channel of a plurality of channels;
        detecting activity in the detected RF energy;
        maintaining knowledge of previous activity on the channel;
        if activity is present on the channel, performing inspection of the activity to determine whether the activity is activity of interest, wherein the activity is activity of interest based on a comparison of the activity with the previous activity;
        aborting the inspection of the activity, if activity is not present on the channel; and
        aborting the inspection of the activity, if the determined activity is not activity of interest.

2. The method of claim 1 wherein the activity is one of voice, data, control, and other message.

3. The method of claim 1 wherein the activity of interest is activity that is addressed to the mobile station.

4. The method of claim 1 wherein the determined activity is not activity of interest if the previous activity and the activity are the same.

5. The method of claim 1 wherein the step of performing inspection further comprises:
    detecting a synchronization message on the channel wherein the synchronization message identifies at least one of voice and data; and
    decoding a slot type field on the channel for further information about data activity, if the synchronization message identified data.

6. The method of claim 5 further comprising
    aborting the inspection, if the synchronization message identified data and the slot type field identifies other; and
    maintaining knowledge that the previous activity on the channel is other activity.

7. The method of claim 1 further comprising continuing the inspection if the previous activity on the channel is different than the activity.

8. The method of claim 7 wherein continuing the inspection further comprises decoding addressing information of the activity to determine whether the activity is addressed to the mobile station.

9. The method of claim 1 further comprising continuing the inspection if a voice header is received on the channel.

10. The method of claim 1 wherein the mobile station is operationally connected to a first base station and the mobile station scans a second base station on the TDMA channel.

11. The method of claim 1 wherein the mobile station scans for other mobile stations on the TDMA channel.

12. A method for scanning a channel by a mobile station in a TDMA wireless communications landscape, the method comprising the steps of:
    at a mobile station in a TDMA wireless communications landscape:
        locking onto a channel of the plurality of channels preprogrammed in a list in the mobile station;
        detecting RF energy on the channel and aborting the scanning if RF energy is not detected;
        if RF energy is detected, detecting a synchronization message on the channel within a time period, decoding a slot type field and aborting the scanning if the synchronization message is not detected;

determining that activity on the channel may be activity of interest based upon the synchronization message and the slot type field; and if the activity may be activity of interest, decoding an address associated with the activity of interest.

13. The method of claim 12 further comprising aborting the scanning if activity is not present on the channel.

14. The method of claim 12 further comprising aborting the scanning if the activity is not activity of interest.

15. The method of claim 12 further comprising maintaining knowledge of previous activity on the channel.

16. The method of claim 15 further comprising aborting the scanning if the previous activity and the activity are the same.

17. The method of claim 12 wherein the activity is one of voice, data, control, and other message.

18. The method of claim 12 wherein the synchronization message identifies at least one of voice and data and the slot type field further informs the identified synchronization message.

19. The method of claim 12 further comprising aborting the scanning if the synchronization message identifies data and the slot type field identifies other.

20. The method of claim 12 wherein the channel is one of an analog channel, a digital FDMA channel, and a digital TDMA channel.

* * * * *